United States Patent [19]

Willingham

[11] Patent Number: 4,590,848
[45] Date of Patent: May 27, 1986

[54] COOKER

[76] Inventor: John H. Willingham, 6189 Heather, Memphis, Tenn. 38119

[21] Appl. No.: 615,294

[22] Filed: May 30, 1984

[51] Int. Cl.[4] ............................................. A47J 37/04
[52] U.S. Cl. ...................................... 99/339; 99/341; 99/345; 99/352; 99/357; 99/419; 99/420; 99/421 V; 99/443 C; 99/446; 99/448; 126/41 A
[58] Field of Search ................. 99/339, 341, 419, 420, 99/421 V, 446, 352, 345, 357, 443 R, 443 C, 448; 126/41 A, 41 R, 25 R, 276; 426/523

[56] References Cited

U.S. PATENT DOCUMENTS

| 2,123,040 | 7/1938 | Hanak | 99/352 |
| 2,520,578 | 8/1950 | Treloar | 99/339 X |
| 2,558,569 | 6/1951 | Koch | 99/421 V X |
| 2,626,559 | 1/1953 | Rau | 99/352 |
| 3,209,671 | 10/1965 | Blacker | 99/357 |
| 3,273,489 | 9/1966 | Wilson | 99/339 X |
| 3,326,201 | 6/1967 | Murray | 99/446 X |
| 3,561,348 | 2/1971 | Weir | 99/446 X |
| 3,967,547 | 7/1976 | Sykes | 99/446 X |
| 4,348,948 | 9/1982 | Allison | 99/339 |
| 4,401,018 | 8/1983 | Berry | 99/420 |

FOREIGN PATENT DOCUMENTS

| 1278337 | 10/1961 | France | 99/339 |
| 567366 | 10/1975 | Switzerland | 99/446 |

Primary Examiner—Billy J. Wilhite
Attorney, Agent, or Firm—Walker & McKenzie

[57] ABSTRACT

A cooker for cooking food such as bar-b-que or the like. The cooker has a cooking tower with a rotating carrousel therein and various means for holding the food as it is being cooked. There is a heat source offset from beneath the cooking tower and positioned below a warming tower located alongside the cooking tower. Both the warming tower and the cooking tower are movably supported by a wheel carriage.

6 Claims, 44 Drawing Figures

FIG. 6
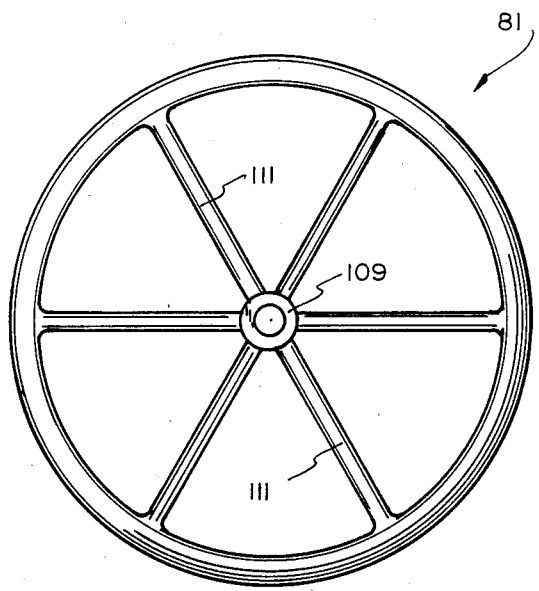
FIG. 9
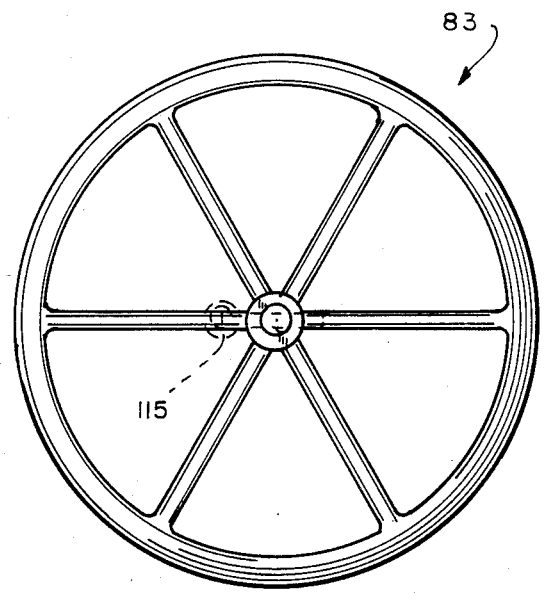
FIG. 7  FIG. 8
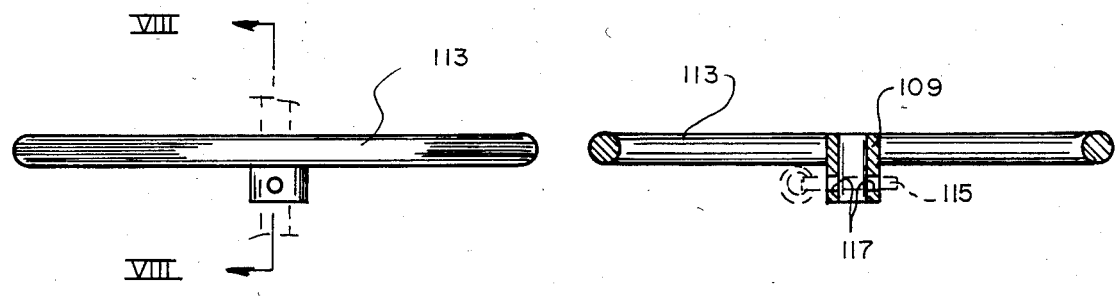
FIG. 10  FIG. 11  FIG. 12
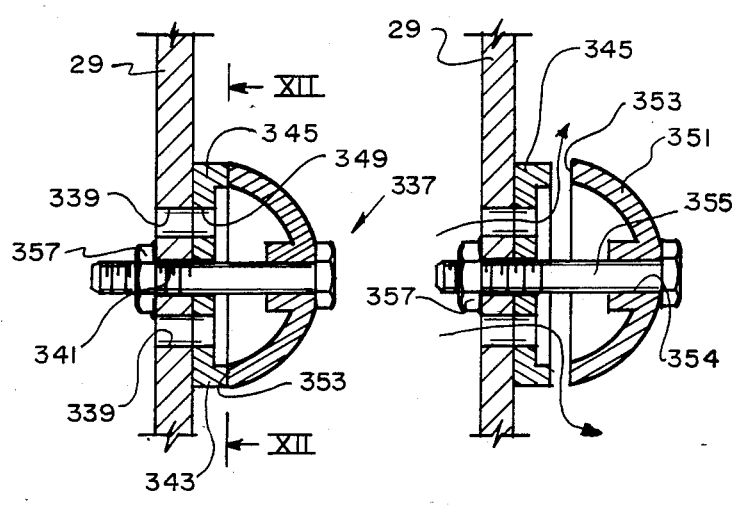
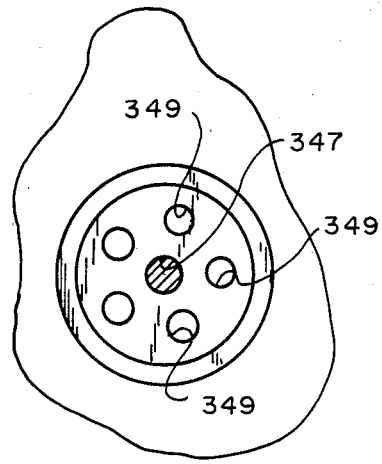

FIG. 16   FIG. 17   FIG. 20   FIG. 21
FIG. 18   FIG. 19
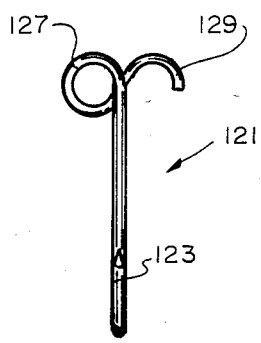
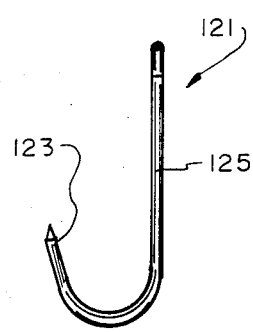
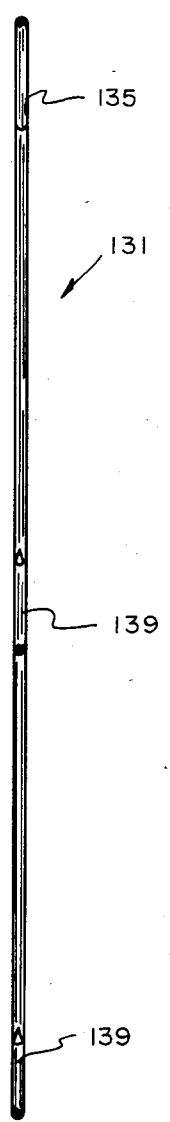
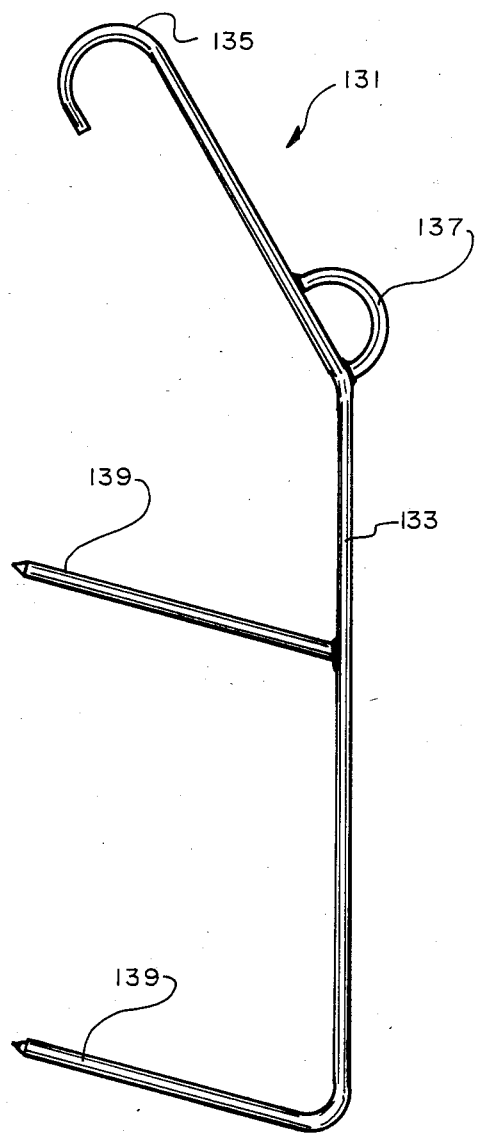
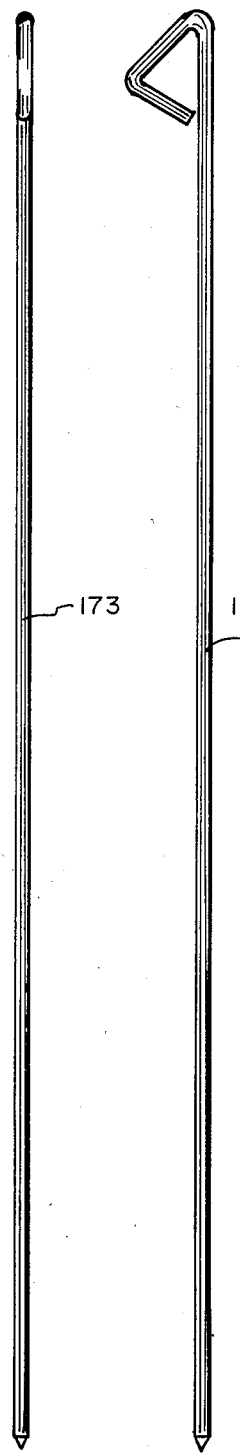

FIG. 22
FIG. 23
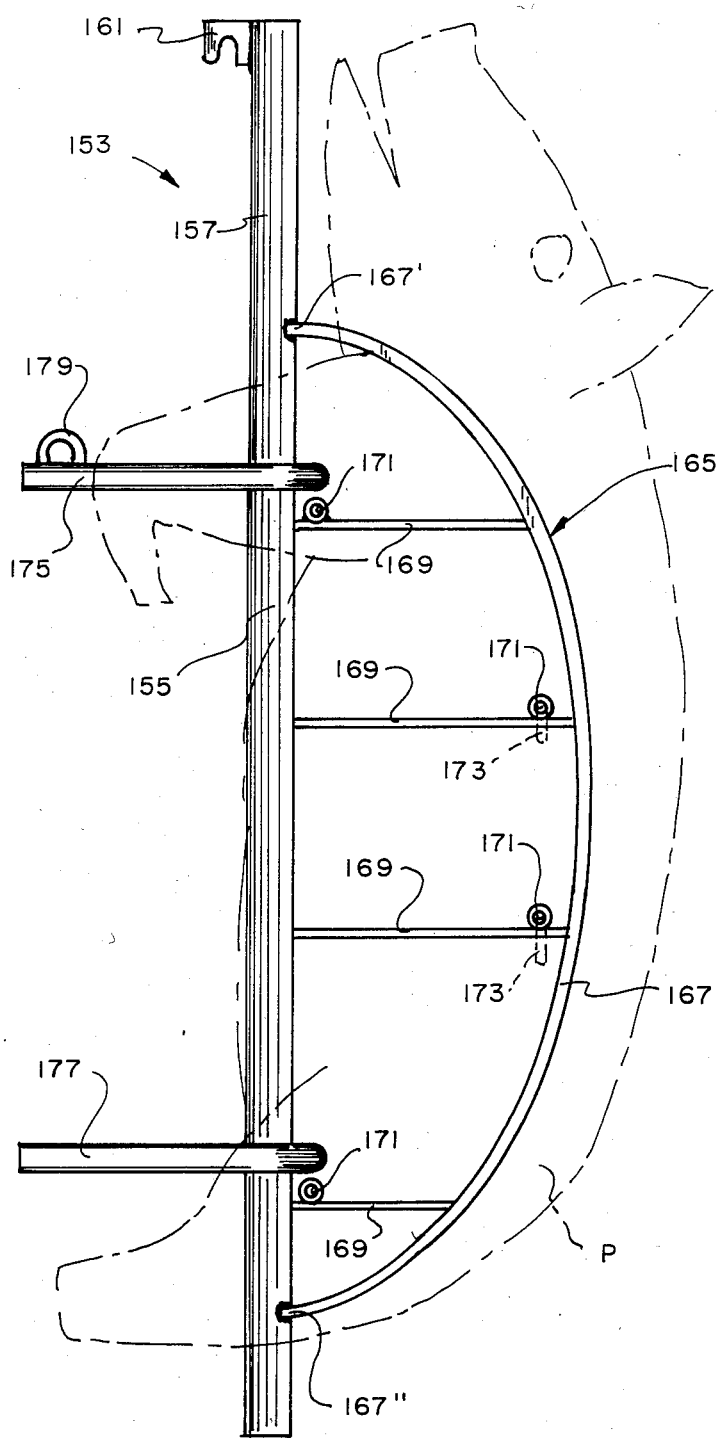
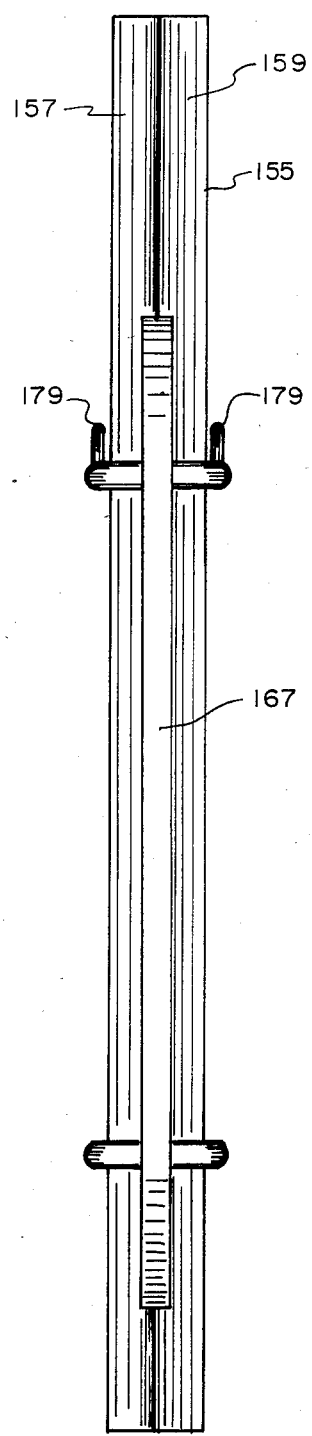

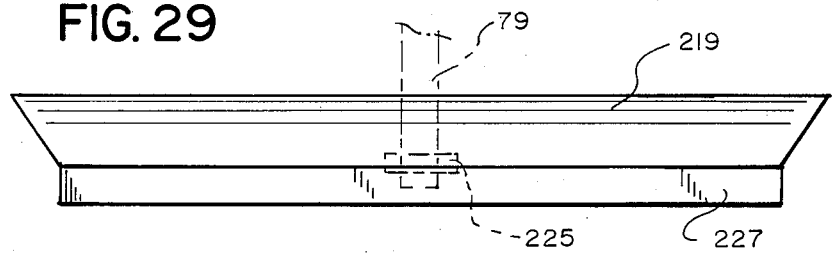
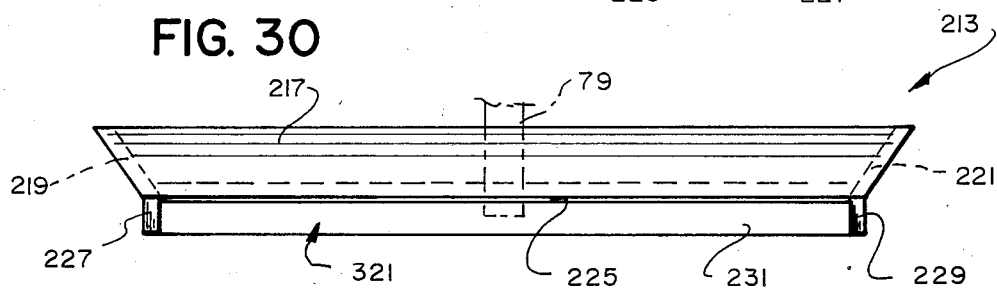
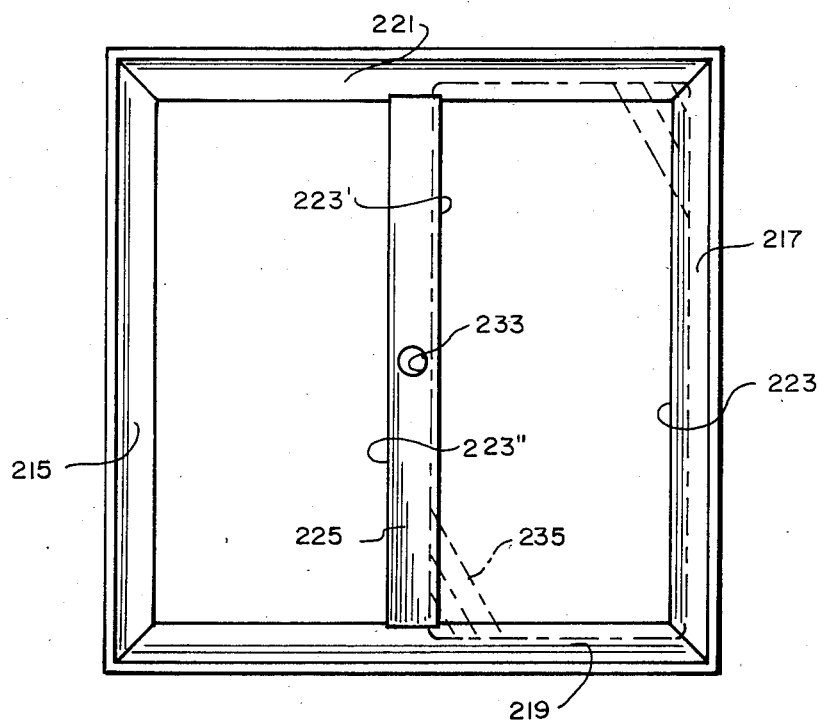

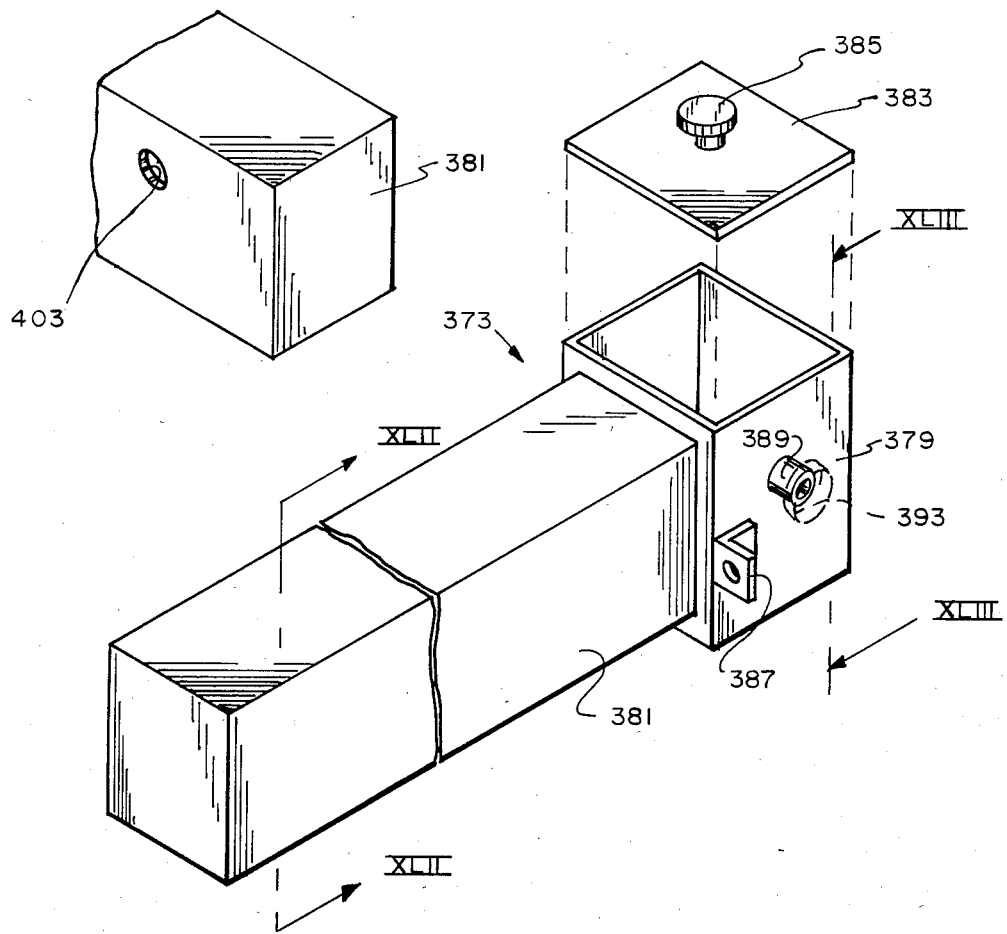
FIG. 44
FIG. 41
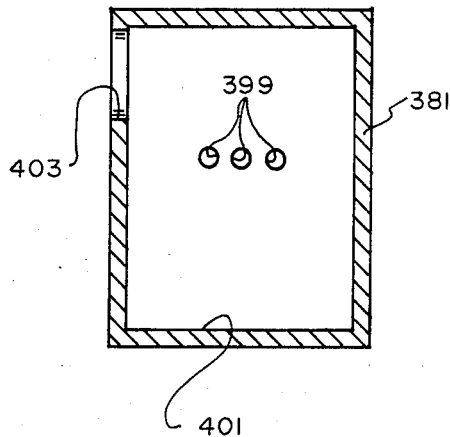
FIG. 42
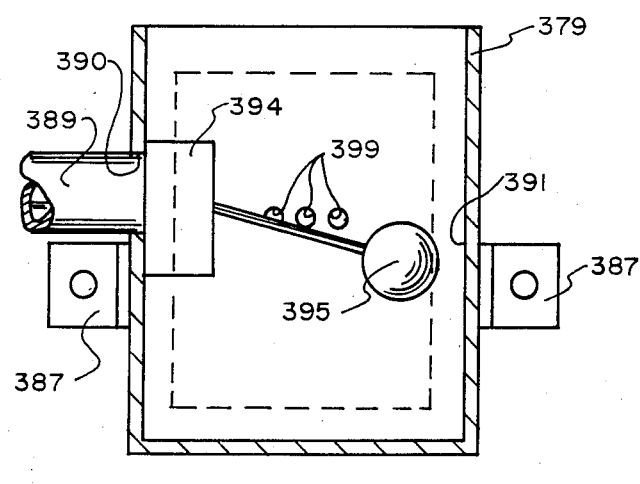
FIG. 43

COOKER

BACKGROUND OF THE INVENTION

1. Field of the Invention

The present invention relates to a cooker for food, such as bar-b-que and the like.

2. Description of the Prior Art

Heretofore, various cooking apparatuses have been developed. See, for example, Ayres, U.S. Pat. No. 34,726; Pinner, U.S. Pat. No. 39,170; Malen, U.S. Pat. No. 434,548; Kubala, U.S. Pat. No. 495,347; Mills, U.S. Pat. No. 1,127,064; Roberts, U.S. Pat. No. 1,141,490; Conley, U.S. Pat. No. 1,272,382; True et al, U.S. Pat. No. 2,867,208; Haley, U.S. Pat. No. 3,191,590; and Holloway, U.S. Pat. No. 3,696,803. None of the above patents disclose or suggest the present invention.

SUMMARY OF THE INVENTION

The present invention is directed towards an improved cooker wherein the quality of cooking is improved, and the cooker is adapted to hold a variety of different foods for the cooking thereof, as for example, shoulders, ribs, hams, whole or halves or parts thereof of pigs or hogs, lambs, goats, deer, domestic or game animals, quail, chicken halves, turkeys, roasts, steaks, hamburgers, corn on the cob, onions, etc.

The concept of the present invention, in general, is to provide a cooking tower having a cooking chamber in the interior thereof, heat source means communicated with the cooking chamber adjacent the lower end thereof for introducing heat into the cooking chamber for upward flow of the heat from adjacent the lower end thereof towards the upper end with the heat source being located to one side of the cooking chamber, exhaust means communicating the cooking chamber adjacent the upper end thereof with the outside atmosphere for exhausting the heat from the upper end of the cooking chamber, and conveying means for conveying the food in the cooking chamber while being cooked.

One of the objects of the present invention is to provide a cooker in which the juice of the food to be cooked is sealed in thereby greatly enhancing the taste of the food.

A further object is to provide such a cooker in which the food is cooked with all faces, sides and edges thereof being heated uniformly and simultaneously.

A further object is to provide such a cooker in which is provided conveying means for conveying the food in the cooking chamber while being cooked.

A further object is to provide such a cooker which includes a cooking tower having a cooking chamber and heat source means communicated with the cooling chamber adjacent the lower end thereof for introducing heat into the cooking chamber for upward flow of the heat from adjacent the lower end towards the upper end and with the heat source means being located to one side of the cooking chamber, whereby any drippings that fall from the food being cooked will not cause a flare-up of the fire.

A further object is to provide in such a cooker a warming tower including a warming chamber in the interior thereof with the warming tower being located alongside of the cooking tower and with the warming chamber being located above the heat source means but partially insulated therefrom to maintain the temperature in the warming chamber substantially below the temperature in the cooking chamber.

A further object is to provide such a cooker in which the conveying means is in the form of at least one carrousel for revolving the food in the cooking chamber. It will be understood that the movement of the carrousel not only causes the meat to travel through the hot and cold spots in the cooking tower to provide increased heat transfer and more uniform cooking of the meat, but also the movement of the meat stirs up the air and causes more uniformity of the heat and moisture in the cooker, therefore providing better cooking.

A further object is to provide such a cooker in which the moisture introduced into the cooking tower from the humidifier means and the juices from the product along with the seasoning rubbed onto the product drop onto the grill below. These droplets explode and vaporize on contact with the grill and then rise to recondense on each surface of the product being cooked. They again form droplets and drop from the product onto the grill and the cycle continues again and again during the entire cooking process. Therefore, the product is basted in its own juices along with the seasoning rubbed into the product or based onto the product. It should be understood that the temperature at the fire box opening where the heat from the fire box enters onto the grill is approximately 600° F. or more. It is this heat which induces the above mentioned explosion/vaporization. This continuing cycle of the rise of the vapors and the fall of the droplets in the cooker is what makes the taste unique.

BRIEF DESCRIPTION OF THE DRAWINGS

FIG. 6 is a plan view of an upper carrousel of the present invention.

FIG. 7 is a side elevational view of the carrousel of FIG. 6.

FIG. 8 is a sectional view taken as on line VIII—VIII of FIG. 7.

FIG. 9 is a plan view of a lower carrousel.

FIG. 10 is an enlarged sectional view of the exhaust for the warming chamber taken as on line X—X of FIG. 3 with the exhaust shown in the closed position.

FIG. 11 is a view similar to FIG. 10 but with the exhaust in an opened position.

FIG. 12 is a sectional view taken as on line XII—XII of FIG. 10.

FIG. 16 is a front elevational view of the hook means of the present invention.

FIG. 17 is a side elevational view of that shown in FIG. 16.

FIG. 18 is a front elevational view of another form of the hanger means of the present invention.

FIG. 19 is a side elevational view of that shown in FIG. 18.

FIG. 20 is a front elevational view of the skewer utilized. with the rack means of the present invention.

FIG. 21 is a side elevational view of that shown in FIG. 20.

FIG. 22 is a front elevational view of that shown in FIG. 13.

FIG. 23 is a side elevational view of the rack means of FIG. 22.

FIG. 29 is a front elevational view of the funnel of the present invention.

FIG. 30 is a side elevational view of the funnel of the present invention.

FIG. 31 is a plan view of the funnel showing in broken lines one of the catch grill means in place in the funnel.

FIG. 41 is a perspective view of the humidifier means of the present invention.

FIG. 42 is a sectional view taken as on line XLII—XLII of FIG. 41.

FIG. 43 is a sectional view taken as on line XLIII—XLIII of FIG. 41.

FIG. 44 is a fragmentary view of a portion of FIG. 41 viewed from the opposite side thereof.

DESCRIPTION OF THE PREFERRED EMBODIMENT

Figure 1:
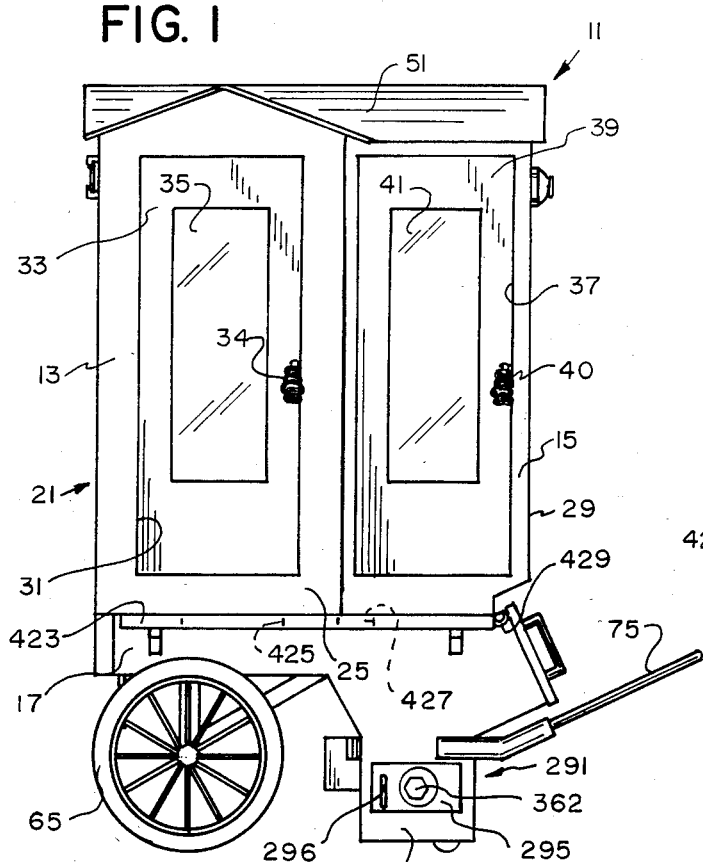
FIG. 1 is a front elevational view of the cooker of the present invention.
Figure 2:
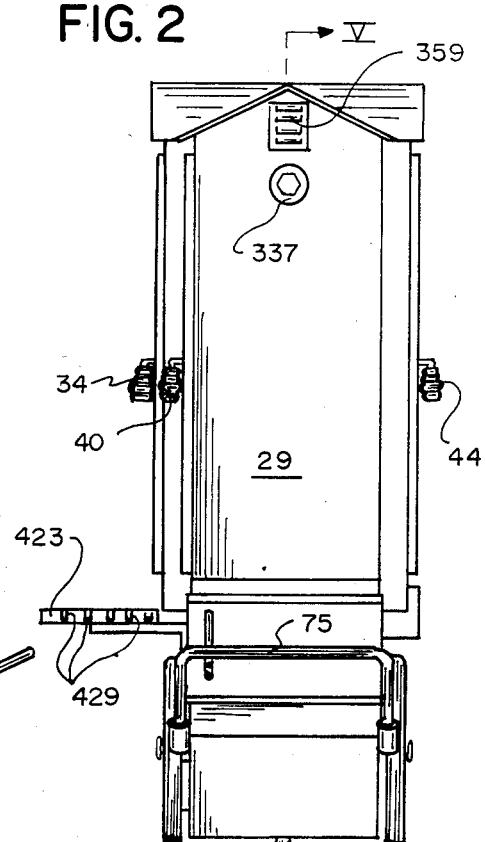
FIG. 2 is a side elevational view from the right side of the cooker.
Figure 3:
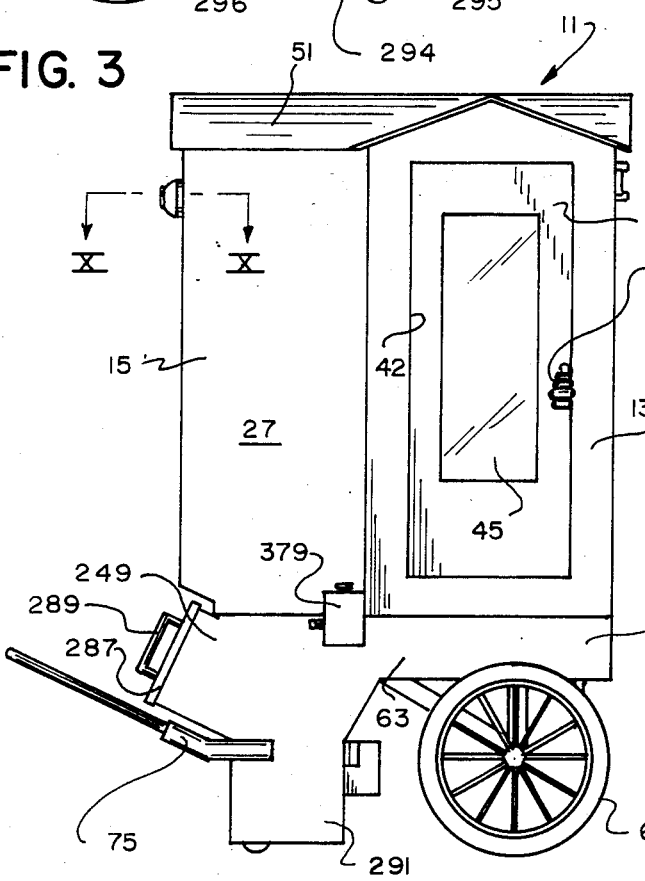
FIG. 3 is a rear elevational view of the cooker.
Figure 4:
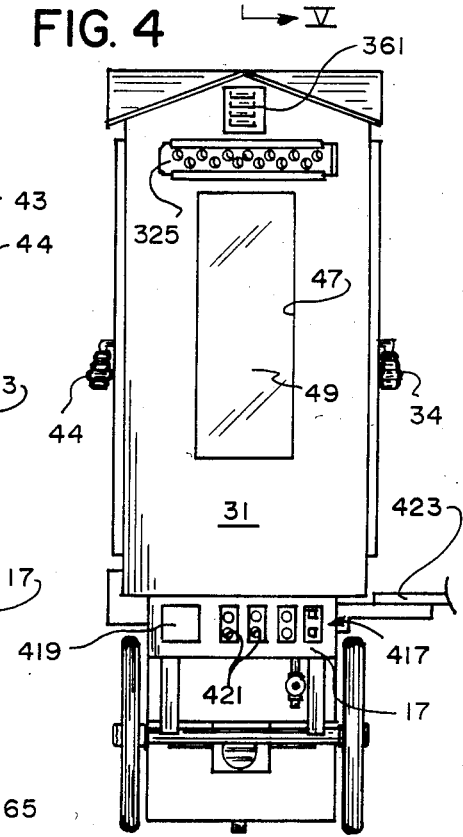
FIG. 4 is a side elevational view of the left side of the cooker.

The cooker 11 of the present invention includes, in general, a cooking tower 13 and a warming tower 15 disposed alongside of the cooking tower 13 with both towers 13, 15 being movably supported by a carriage 17, and a heat source 19 supported by carriage 17 below warming tower 15.

Cooking tower 13 and warming tower 15 comprise the body 21 of the cooker 11 and are preferably formed as a unit with a common wall 23 therebetween. In addition to wall 23, body 21 includes a front wall 25, a back wall 27, a right side wall 29, and a left side wall 31 joined along the adjacent edges.

In front wall 25 there is a rectangular opening 31 to provide access to the interior of cooking tower 13. There is a door 33 provided in opening 31 for the opening and closing thereof. Door 33 is provided with the usual hinges, not shown for pivotally mounting door 33 about a vertical axis. In addition, there is a latch means, not shown, such as for example a conventional magnet type latch for latching door 33 in a closed disposition. Also, a handle 34 is provided. A glass window 35 is provided in door 33 whereby the interior of cooking tower 13 may be viewed.

Front wall 25 is also provided with another opening 37 to gain access to the interior of warming tower 15. A door 39 similar to door 33 is provided to open and close the opening 37. Also, a handle 40 is provided. Door 39 includes a glass window 41 for viewing into the interior of warming tower 15.

Additionally, there is preferably an opening 42 in back wall 27 for gaining access into the interior of cooking tower 13 from the back thereof. Also, a door 43 similar to door 33 is provided for opening and closing the opening 42. In addition, a handle 44 is provided. A glass window 45 is preferably provided in door 43 for viewing the interior of cooking tower 13 from the back side thereof. In addition, there is preferably an opening 47 in side wall 31 with a window 49 fixedly mounted therein.

Cooker 11 is provided with a gabled roof 51 that extends over the top of cooking tower 13 and warming tower 15 as best seen in FIGS. 1–4.

In the interior of cooker 11 and spaced below roof 51 there is provided a ceiling or panel 53 that extends from side wall 29 to side wall 31 and between front wall 25 and back wall 27 to establish the upper boundary or ceiling 55 of the cooking chamber 57 provided in the interior of cooking tower 13 and to establish the ceiling 59 or upper boundary of the warming chamber 61 provided in the interior of warming tower 15.

Carriage 17 includes an underbody 63 which forms the bottom of cooker 11 and has its upper edge integrally or fixedly attached to the lower edge of body 21. In addition, carriage 17 includes a pair of wheels 65 rotatably mounted on an axle 67 which in turn is attached to underbody 63 beneath cooking tower 13 by supports 69 and braces 71. A swivel wheel 73 is attached to underbody 63 beneath warming tower 15 to provide ease in maneuvering cooker 11 when moving from place to place. In addition, there is provided a handle 75 attached to underbody 63 and extending outwardly therefrom for use in pushing or pulling cooker 11 for the moving thereof.

In cooking chamber 57 there is a conveying means or mechanism 77 which in general includes a shaft 79 that is rotatably mounted vertically and centrally of cooking chamber 57, a pair of carrousels, i.e., an upper carrousel 81 and a lower carrousel 83, which are vertically movably mounted on shaft 79, a driving mechanism 85 for rotating shaft 79, and holding means 87 supported from shaft 79 for holding the food F to be cooked.

More specifically, shaft 79 extends upwardly through an opening 89 in a panel 53 where it is rotatably mounted from panel 53 by a suitable bearing 91. Shaft 79 extends into attic space 93 provided between panel 53 and roof 51. The upper end of shaft 79 is provided with a bevel gear 95 fixed thereto which meshes with another bevel gear 97 fixed to the end of a horizontally disposed shaft 99 that is rotatably supported from panel 53 by bearings 101. Shaft 99 is coupled to the shaft 103 of an electric motor 105 by a suitable coupler 107 so that when motor 105 is turned on, it causes the shaft 79 to be rotatably driven through the mechanism hereinabove described.

Upper carrousel 81 is wheel-like in construction and includes a hub 109 slidably mounted on shaft 79, a plurality of spokes 111 fixedly attached to hub 109 and radially extending therefrom to the rim 113 of carrousel 81 where the spokes 111 are fixedly attached thereto.

Positioning means is provided for holding carrousel 81 at a selected position along the length of shaft 79 and preferably comprises the following: a pin 115 removably extends through aligned apertures 117 in hub 109 and through a selected one of transverse holes 119 spaced along the length of shaft 79.

Lower carrousel 83 is constructed substantially identically with upper carrousel 81 and the above description of carrousel 81 will suffice for both. It will be understood that additional carrousels 81, 83 may be provided if desired, particularly with larger cookers.

Figure 5:
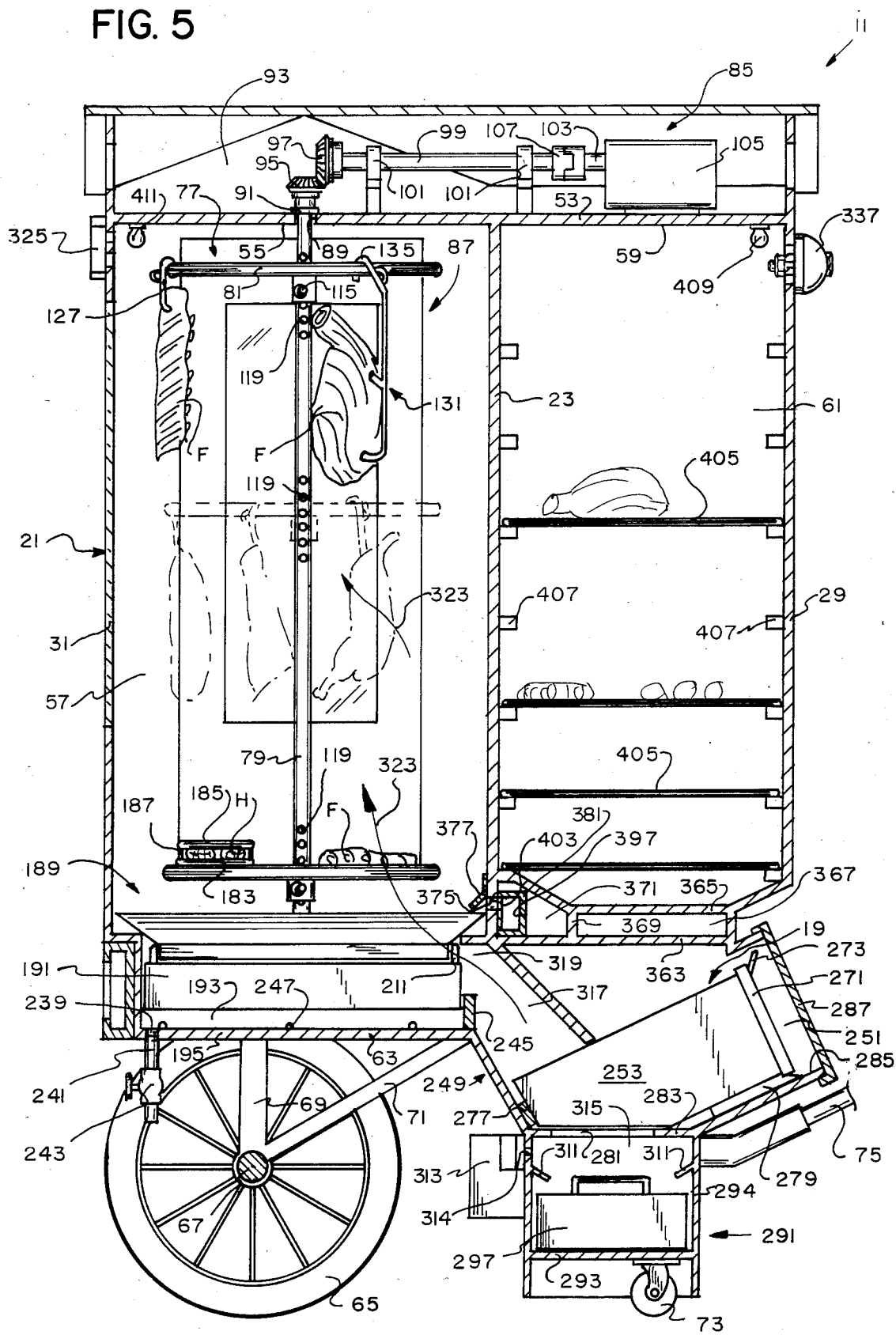
FIG. 5 is an enlarged sectional view taken as on the line V—V of FIG. 2.

Holding means 87 includes various forms, depending upon the particular food being cooked. Thus, holding means 87 may include the hook type or hook means 121 best shown in FIGS. 16 and 17. Hook means 121 includes a pointed hook 123 integrally attached to shank portion 125 to which is integrally attached an eyelet 127 which in turn has an arcuate finger portion 129 integrally attached thereto and which is sized to fit over spokes 111 or rim 113 of carrousel 81 or 83 whereby the food F is hung from the carrousel as shown in FIG. 5. The purpose of eyelet 127 is to receive a hook handler, not shown, for removing and replacing hook means 121 on rim 113. Hook means 121 is useful for hanging different types of food from carrousel 81 or 83, as for example, ribs, quail, chicken halves, etc.

Another form of holding means 87 is the hanger means 131 best seen in FIGS. 18 and 19. Hanger means 131 includes a shank portion 133 and a finger portion 135 for hooking over spokes 111 or rim 113, as best seen in FIG. 5. Also, hanger means 131 includes an eyelet 137 for the same purpose as eyelet 127 of hook means 121, and includes a plurality of vertically spaced prongs 139. The prongs 139 are fixedly attached to shank portion 133 and extend outwardly and upwardly therefrom as best seen in FIG. 19. Hanger means 131 is preferably used for holding food, which is impaled on prongs 139, such as shoulders, hams, large turkeys, front quarters or hind quarters of a lamb or pig or the like, large pieces of beef, roasts, prime ribs, etc.

Figure 14:
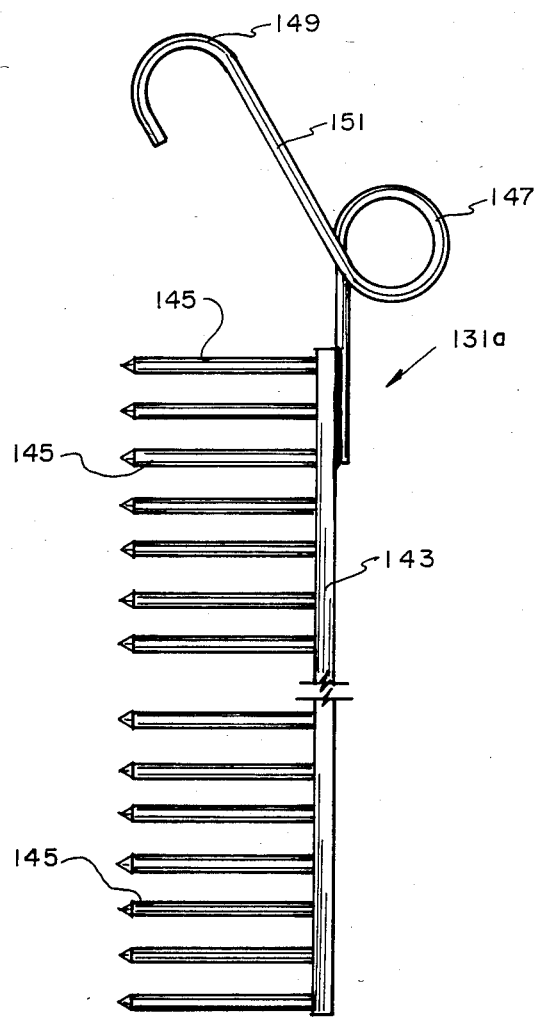
FIG. 14 is a front elevational view of a hanger means of the present invention.
Figure 15:
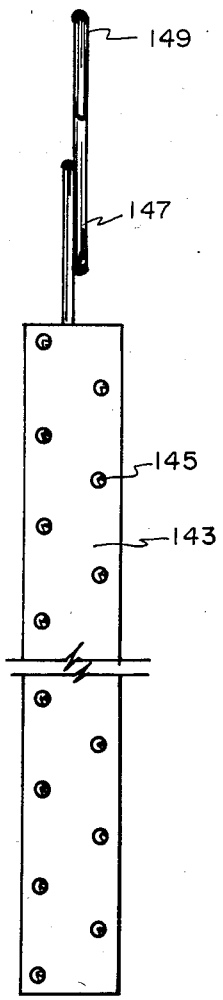
FIG. 15 is a side elevational view of that shown in FIG. 14.
Figure 24:
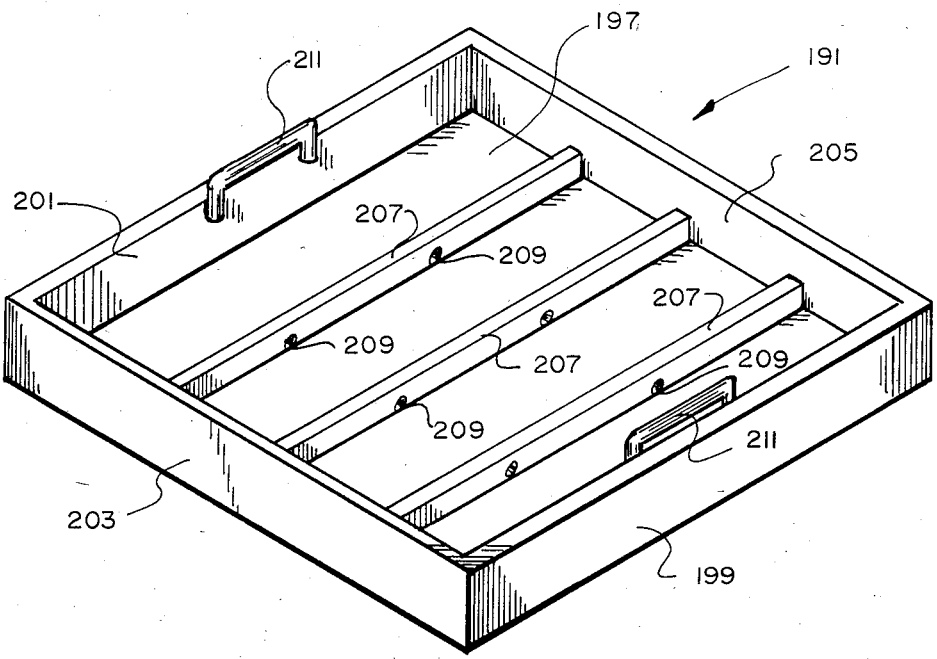
FIG. 24 is a perspective view of the au'jus tray of the present invention.

Another form of hanger means is best seen in FIGS. 15 and 14 wherein the hanger means 131a includes a plate-like shank portion 143 that has a plurality of prongs 145 fixedly attached thereto in staggered relationship as best seen in FIG. 15 and extending substantially perpendicularly outwardly therefrom as best seen in FIG. 14. Hanger means 131a also includes an eyelet 147 and a finger portion 149 which are preferably formed by a heavy piece of wire 151 or the like that is looped to form eyelet 147 and bent arcuately at the upper end thereof to form finger portion 149 as best seen in FIG. 14. The lower end of wire 151 is attached to shank portion 143 adjacent the upper end thereof as by welding or the like as best seen in FIG. 14. Finger portion 149 is for the purpose of hanging hanger means 131a from the carrousel 81 or 83 in the manner heretofore described relative to finger portion 129 and 135.

Also, eyelet 147 is for the same purpose as heretofore described for eyelet 127. It will be seen in FIGS. 14 and 19 that finger portions 149 and 135 are respectively disposed above the prongs 145, 139 for distributing the weight of the food hung on the prongs so that they hang substantially vertically.

Figure 13:
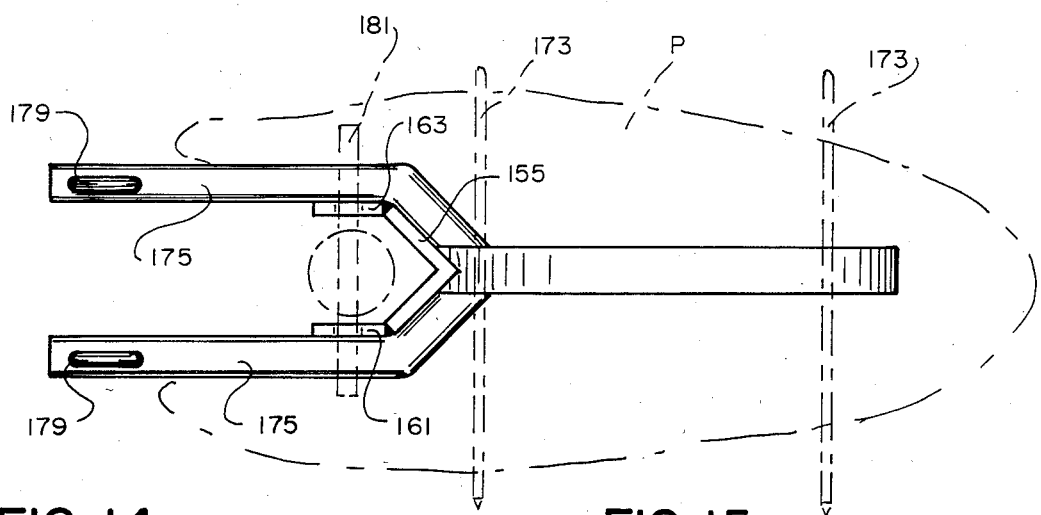
FIG. 13 is a plan view of a rack means of the present invention.

Another form of the holding means is best seen in FIGS. 13, 22, and 23 which is in the form of rack means 153 for holding a whole hog, pig, lamb or the like. Rack means 153 includes an angle member 155 having side members 157, 159 and finger members 161, 163 respectively fixedly attached to side members 157, 159 as by welding or the like. Rack means 153 also includes an open framework 165 which extends up into the interior of the pig or the like which is split open from the underside thereof. Framework 165 includes an arcuate member 167 having the opposite ends thereof fixedly attached to angle member 155 as by welding or the like in spaced apart relationship as at 167', 167'', as best seen in FIG. 22. A plurality of braces 169 extend between and are fixedly attached at the ends thereof respectively to angle member 155 and arcuate member 167, as by welding or the like. A plurality of tubular sockets 171 are respectively fixedly attached to braces 169. A plurality of skewers or pin means 173 are provided for respectively extending through sockets 171 and through the pig or the like to attach the split animal carcass P to the framework 165, as best seen in FIGS. 13 and 22. Rack means 153 also preferably includes four legs, i.e., a laterally spaced front pair 175, and a laterally spaced rear pair 177. Legs 175, 177 are fixedly attached to rack means 153, as by welding or the like and extend perpendicularly therefrom in a direction away from framework 165. Eyelets 179 are respectively fixedly attached to legs 175 for the same purpose as eyelet 127.

In using rack means 153 for cooking an animal carcass P, the carcass is placed on rack means 153 as best seen in FIG. 22 and as heretofore described utilizing skewers 173, then rack means 153 is hung on shaft 79 by utilizing a pin 181 extending through one of the holes 119, with finger members 161, 163 being engaged thereover and with angle member 155 being disposed vertically as best shown in FIG. 22. When the animal carcass P is cooked, then the eyelets 179 are engaged by a hook handler, not shown, to remove rack means 153 with the animal thereon, whereupon it may be turned 90° so that angle member 155 is disposed horizontally and with the legs 175, 177 engaging a supporting surface as a tray or the like which can be utilized for serving the cooked meat and other food arranged around the rack in the tray.

Another form of the holding means includes a lower grill means 183 and an upper grill means 185 (see FIG. 5) pivotally mounted to lower grill means 183 by a suitable hinge 187 so that meat such as hamburgers H may be held between lower and upper grill means 183, 185 and latched together by a suitable latch 189. For cooking, the grill means 183, 185 are simply placed with the hamburgers therebetween on one of the carrousels 81 or 83.

It will be understood that when utilizing rack means 153, the lower carrousel 83 is preferably moved to a lower position like that shown in FIG. 5. However, normally when rack means 153 is not being used, preferably the lower carrousel 83 is moved to a position substantially midway between the lower and upper ends of shaft 79, although the carrousels 81, 83 may be moved to any selected positions desired.

Collection and removal means 189 is provided for collecting and removing the juice which drips down from the meat and the like in the cooking chamber 57. Collection and removal means 189 preferably includes an au'jus tray 191 which rests on ribs 193 (only one of which is shown) that extend transversely in fore and aft spaced relationship on bottom wall 195 (i.e., that portion of underbody 63 below cooking chamber 57).

Au'jus tray 191 includes a solid bottom 197, side walls 199, 201 upstanding from opposite side edges of bottom 197, front wall 203 and back wall 205 joined at their ends with side walls 199, 201 and upstanding from the front and back edges of bottom 197 respectively to establish an upwardly opening tray. There are forwardly and rearwardly extending dividers 207 that are laterally spaced apart and mounted on bottom 197 with the dividers 207 extending from front wall 203 to back wall 205. The dividers 207 only extend a minor distance upwardly compared to the height of the walls 199, 201, 203 and 205. There are holes 209 that extend through dividers 207 to equalize the juice in the spaces between the dividers 207. The purpose of dividers 207 is to lessen the possibility of spillage of the juice from the au'jus tray 191, particularly when the cooker 11 is being moved from place to place. There are handles 211 respectively attached to side walls 199, 201 adjacent the upper edges thereof which are adapted to be grasped to remove and replace the au'jus tray 191.

Collection and removal means 189 includes a funnel 213, best seen in FIGS. 29, 30, and 31, which is supported by au'jus tray 191, as best seen in FIG. 5. Funnel 213 includes a pair of laterally spaced side members 215, 217, and a pair of spaced front and rear members 219, 221, extending between the side members 215, 217 and respectively joined to the adjacent ends thereof to establish an opening 223. Extending between front member 219 and back member 221 adjacent the mid portion thereof is a member 225 which divides the opening 223 into two rectangular openings 223' and 223". A skirt 227 depends from front member 219. Similarly, skirts 229 and 231 respectively depend from back member 221 and side member 215. A hole 223 extends vertically through member 225 to rotatably receive the lower end of shaft 79 to hold the shaft in place.

Figure 28:
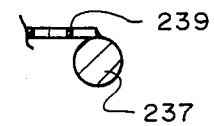
FIG. 28 is an enlarged fragmentary sectional view taken as on line XXVIII—XXVIII of FIG. 27.

A pair of catch grill means 235 are provided which are supported by funnel 213 and respectively cover openings 223', 223". The manner in which catch grill means 235 is supported over opening 223' is best seen in FIG. 31. Catch grill means 235 includes a rectangular open framework 237 formed of round stock as best seen in FIG. 28. Fixedly mounted across the open framework 237 is the grill work 239 formed in the usual manner by crossed pieces of steel or the like.

If desired, au'jus tray 191 may be omitted, in which case the juice from the cooking chamber 57 is collected on bottom wall 195 where it is removed through a drain 239 in bottom wall 195. Drain 239 includes a pipe 241 leading from the space above bottom wall 195 and includes a valve 243 interposed in pipe 241. An upstanding wall 245 is disposed across the edge of wall 195 and extends upwardly therefrom to retain the juice and also act as a stop for au'jus tray 191 when utilized. A plurality of openings 247 are provided in ribs 193 adjacent wall 195 so that the juice will equalize on either side of the ribs 193.

Figure 32:
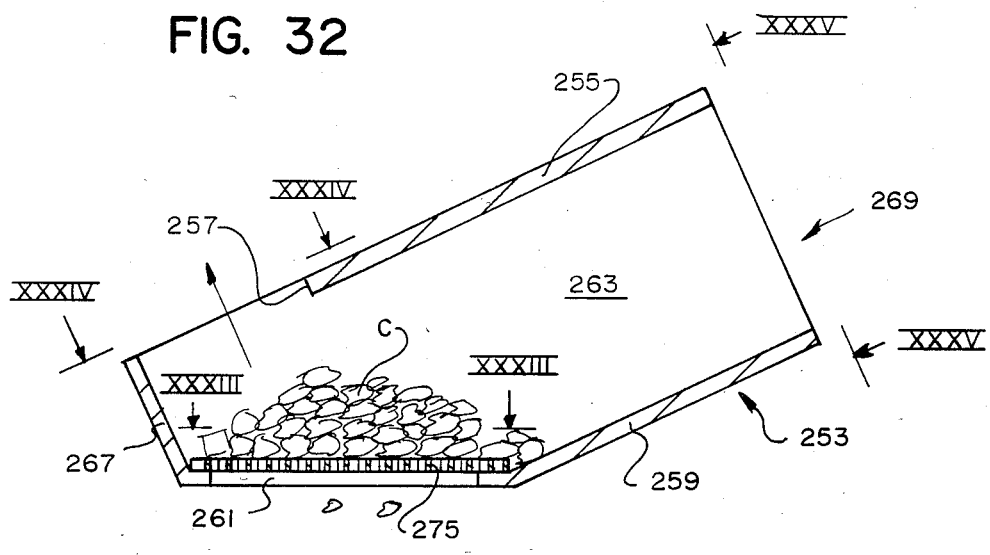
FIG. 32 is a sectional view taken as on a vertical plane through the fire box means of the present invention.
Figure 33:
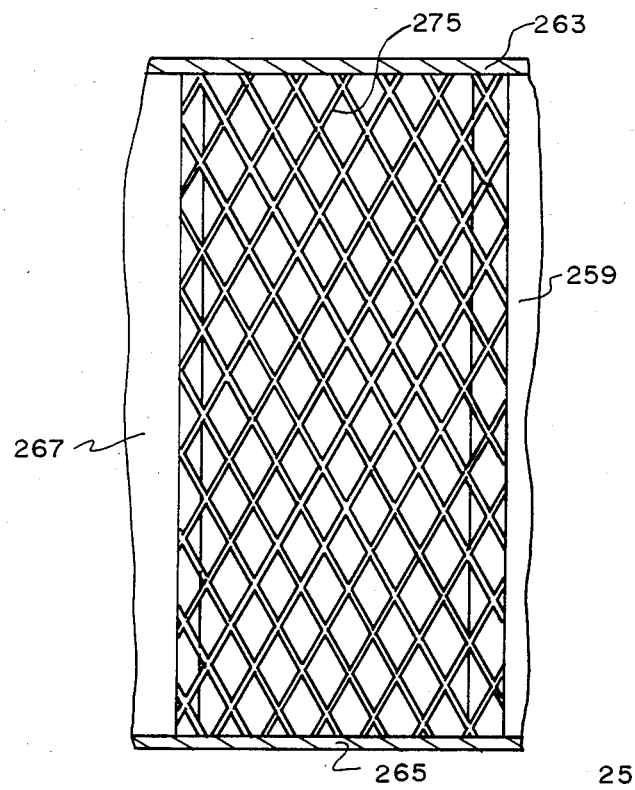
FIG. 33 is a view taken as on the line XXXIII—XXXIII of FIG. 32.
Figure 34:
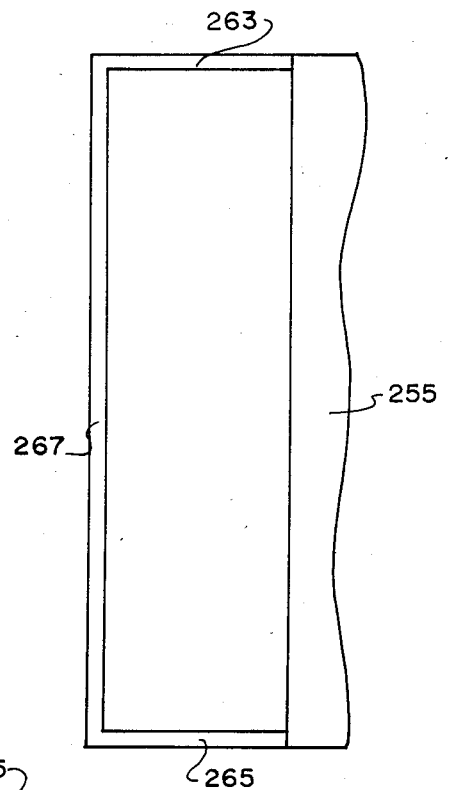
FIG. 34 is a view taken as on the line XXXIV—XXXIV of FIG. 32.
Figure 35:
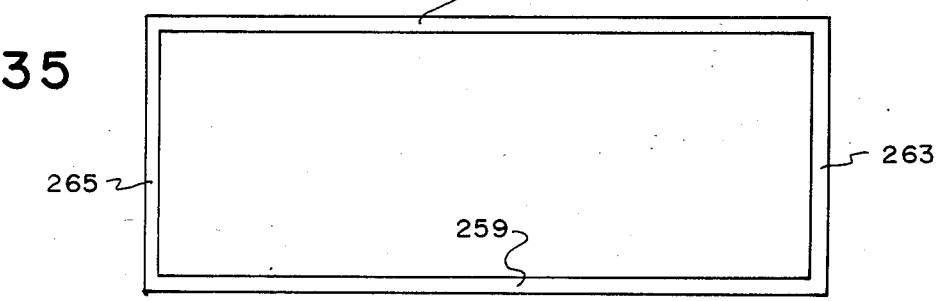
FIG. 35 is a view taken as on line XXXV—XXXV of FIG. 32.
Figure 36:
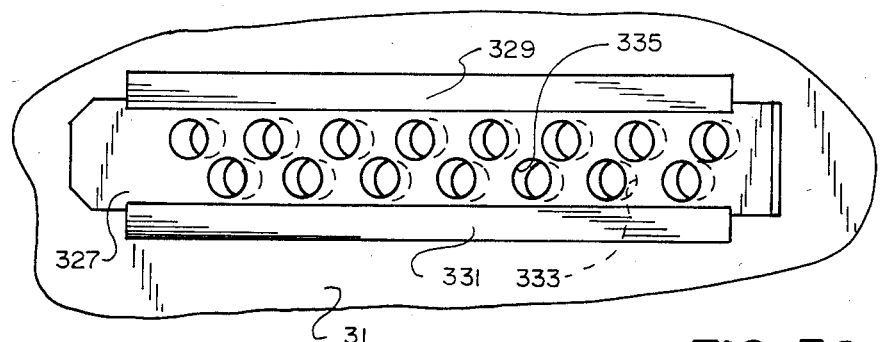
FIG. 36 is an enlarged view of an exhaust means of the present invention.
Figure 37:
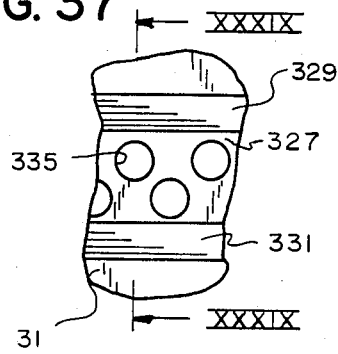
FIG. 37 is a fragmentary view of that shown in FIG. 36 with the exhaust means shown in a fully open position.
Figure 38:
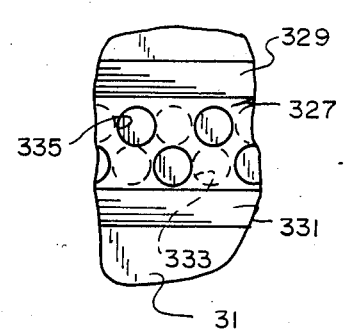
FIG. 38 is a view similar to FIG. 37 but with the exhaust means shown in a fully closed position.

Underbody 63 depends downwardly for a portion below warming chamber 61, as at fire box portion 249 (see FIG. 3), which is hollow on the interior thereof to provide a fire box chamber 251 (see FIG. 5). A fire box 253 is removably received in fire box chamber 251, as best seen in FIG. 5. Fire box 253 is preferably hollow and box like in construction. Fire box 253 includes a top panel 255 having an exit opening 257 therein, a bottom panel 259 which is in parallel spaced relationship with top panel 255 and which has an opening 261 therein at an angle relative to the main portion of bottom panel 259 (FIG. 32). Fire box 253 also includes side panels 263, 265, and end panel 267. The open end 269 of fire box 253 is removably closed by a cover 271 having a handle 273. The opening 261 of fire box 253 is covered by a grate 275 upon which are disposed a source of heat as charcoal C or the like. Fire box 253 is slidably and removably mounted in fire box chamber 251 at an angle as best seen in FIG. 5. with end panel 267 resting against the bumper 277 and bottom panel 259 resting against a support 279. Bumper 277 and support 279 are fixedly mounted in the interior of fire box portion 249, as best seen in FIG. 5. When fire box 253 is in place as previously described, grate 275 is disposed substantially horizontally above an opening 281 in the bottom wall 283 of fire box portion 249. There is an access opening 285 in fire box portion 249 through which fire box 253 is removed and replaced. There is a cover 287 for removably closing the opening 285. Cover 287 is preferably provided with a handle 289 (see FIG. 3).

Figure 40:
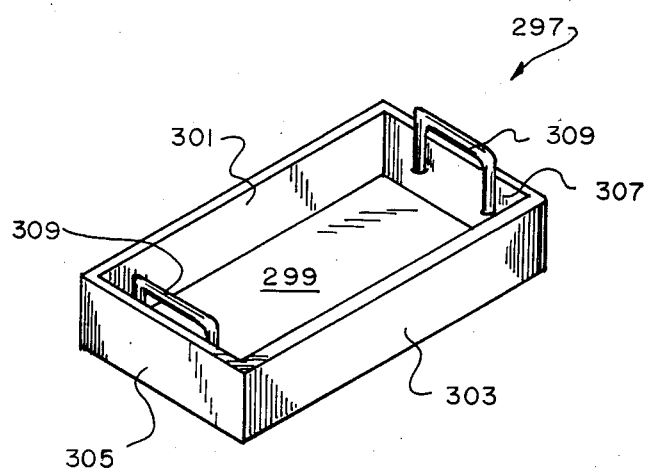
FIG. 40 is a perspective view of the ash box of the present invention.

Underbody 63 additionally includes an ash box portion 291 below fire box portion 249 and depending therefrom. Ash box portion 291 is provided with a bottom 293 to which swivel wheel 73 is attached and is provided with side walls 294, and suitable door means 295 having a handle 296, well known to those skilled in the art for providing access to an ash box 297 which is supported on bottom 293 below opening 281. Ash box 297 is preferably square in construction as best seen in FIG. 40 and includes a bottom 299, upstanding sides 301, 303 and ends 305, 307 upstanding from bottom 299 and joined adjacent the ends thereof to establish the upwardly opening ash box 297. A pair of handles 309 are fixedly attached to ends 305, 307 by suitable means as by welding or the like for carrying the fire box. Deflectors 311 are provided in the interior of fire box portion 291 for deflecting the ashes into the ash box 297.

Figure 39:
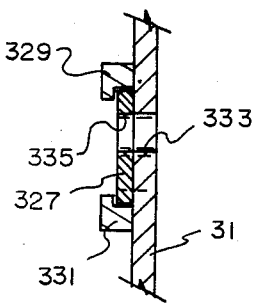
FIG. 39 is a sectional view as taken on line XXXIX—XXXIX of FIG. 37.

A suitable fan 313 of a construction well known to those skilled in the art is provided to force air from the outside atmosphere inwardly through an opening 314 into a chamber 315 in the interior of ash box portion 291 and upwardly through opening 281, through the coals C thereon and thence upwardly through opening 257 in fire box 253, then through a conduit 317 provided in fire box portion 249 which communicates opening 257 with collection and removal means 189 through an opening 319 in the side thereof above wall 245. It will be understood that the flow of heat from the heat source 19 is as above described through the opening 319 and thence through an opening 321 provided in funnel 213 by the omission of a skirt along one side of the funnel 213. Thus, it will be understood that there are only three skirts 227, 229, and 231 that depend from the sides, 219, 221 and 215 of funnel 213 leaving the opening 321 below side 217. Thus, the heat will travel through the pathway above described and thence upwardly through the openings 223', 223" in funnel 213, and generally upwardly through the cooking chamber 57 as shown by the arrows 323. Then, the heat will flow outwardly from cooking chamber 57 to the outside atmosphere through the exhaust means 325 adjacent the upper end of cooking tower 13. Exhaust means 325 is best seen in FIGS. 36, 37, 38 and 39, and includes in general a sliding plate 327 and upper and lower guides 329, 331. Upper and lower guides 329, 331 are preferably right angular in cross section and extend inwardly towards one another in spaced apart relationship as best seen in FIG. 39 to slidably hold and guide the upper and lower edges of sliding plate 327. Upper and lower guides 329, 331 are mounted by suitable means as by welding or the like to the outside of wall 31 with the wall 31 having a plurality of apertures 333 therethrough in the area between upper and lower guides 329, 331. Also, sliding plate 327 is provided with a plurality of apertures 335 therethrough which are similar in spacing and size to the apertures 333, whereby the apertures 333, 335 may be aligned for full opening of the exhaust means (see FIG. 37), completely misaligned for shutting off the exhaust means 325 (see FIG. 38), and with various degrees of misalignment therebetween to provide the desired amount of exhaust of the heat therethrough (see FIG. 36 for one such degree of misalignment).

Also, an exhaust device 337, best seen in FIGS. 5, 10, 11, and 12 is provided for warming chamber 61. Thus, wall 29 is provided with a plurality of apertures 339 arranged in a circle around a central aperture 341 in wall 29. Additionally, exhaust 337 includes a circular base member 343 having a protruding circular rim 345. Base member 343 has a central aperture 347 therethrough corresponding to central aperture 341 and apertures 349 therethrough arranged in a circle and corresponding in size and position to apertures 339. Exhaust 337 additionally includes a dome shaped member 351 which has a circular edge 353 corresponding in size and position to rim 345. In addition, member 351 has an aperture 353 centrally thereof. A bolt 354 extends through apertures 353, 347, and 341 as best seen in FIGS. 10 and 11. Bolt 354 is fixedly mounted relative to member 351 as by welding or the like. A nut 357 is fixedly mounted on the inside wall of 29 with the threaded aperture therein in alignment with aperture 341 whereby bolt 355 threadedly engages nut 357, as best seen in FIGS. 10 and 11. It will be understood that member 351 can be turned to close the exhaust 337, as best seen in FIG. 10 wherein the circular edge 353 is in engagement with rim 345, or may be turned in the opposite direction to open the space between edge 353 and rim 345, as best seen in FIG. 11, to open the exhaust the desired amount. One or more exhausts 337 may be provided depending upon the size of the cooker 11. It will be understood that if desired the exhaust for warming chamber 61 may be of the type heretofore described relative to exhaust means 325. Also, if desired, the exhaust means for the cooking tower 13 may be like exhaust 337.

A louvered exhaust 359 of a construction well known to those skilled in the art, is preferably provided through the portion of right side wall 29 that extends above panel 53 to provide the side wall for attic space 93. Similarly, a louvered exhaust 361 is preferably provided through the portion of wall 31 that extends upwardly beyond panel 53 to provide the opposite side wall for attic space 93. An air inlet 362 of suitable construction, as for example, like device 337 is provided in door 295.

Warming tower 15 has a double bottom 363 and 365, as best seen in FIG. 5, which are spaced apart to provide a dead air space 367 therebetween. Air space 367 is disposed between the heat source 19 and warming chamber 61 to partially insulate the warming chamber 61 from heat source 19 and maintain the temperature in warming chamber 61 substantially below the temperature in cooking chamber 57.

A portion of the space between the bottom walls 363 and 365 is blocked off by a partition 369 to provide a space 371. Humidifier means 373 is provided (see FIGS. 41, 42, 43, and 44) for humidifying the air in cooking chamber 57 through the opening 375 provided in wall 23 between humidifier space 371 and cooking chamber 57. A shield 377 is provided on the cooking chamber side of wall 23 above opening 375, as best seen in FIG. 5. Humidifier means 373 includes a water box 379 and a conduit 381. Water box 379 is box-like in construction with the opened upper end thereof being normally closable by a lid 383 having a handle 385 attached thereto. Water box 379 is attached to the outside of underbody 63 by suitable means as brackets 387, and suitable bolt means, not shown. A hose pipe 389 leads from the exterior of water box 379 through an opening 390 therein to the water chamber 391 in the interior thereof. A hose connection 393 of well known construction is preferably provided so that a water hose may be attached thereto. A float valve 394, including a float 395, of a construction well known to those skilled in the art, is provided on hose pipe 389 in the interior of water box 379 so that the level of water in water chamber 391 will be kept substantially constant. Conduit 381 extends through an opening 397 in wall 27 and into space 371. Apertures 399 are provided through water box 379 to communicate the interior chamber 401 of conduit 381 with the water in water chamber 391 so that water flows into interior chamber 401. It will be understood that the heat from heat source 19 will cause the water in interior chamber 401 to vaporize and flow outwardly through an aperture 403 provided in conduit 381. The vaporized water will then flow outwardly through opening 375 into cooking chamber 57.

Figure 25:
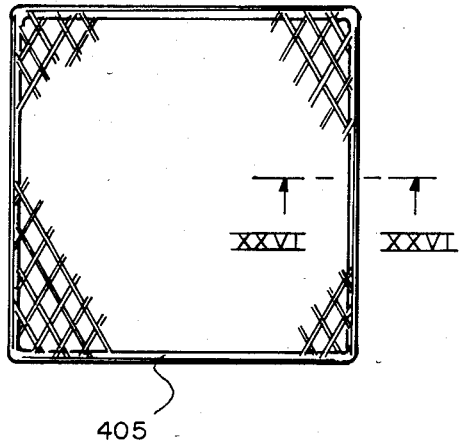
FIG. 25 is a plan view of one of the shelves of the warming chamber of the present invention.
Figure 27:
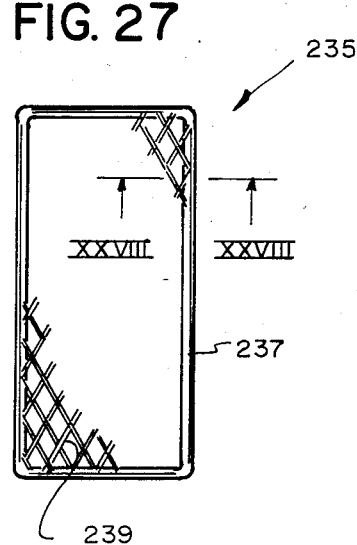
FIG. 27 is a plan view of one of the catch grill means of the present invention.
Figure 26:
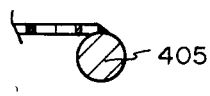
FIG. 26 is a fragmentary enlarged sectional view taken as on line XXVI—XXVI of FIG. 25.

In the interior of warming chamber 61 are provided a plurality of shelves 405, as best seen in FIGS. 5 and 25, which are preferably constucted similar to grill means 235. The shelves 405 are removably supported by lugs 407.

A light 409 is preferably provided in warming chamber 61 adjacent the upper portion thereof. Likewise, a light 411 is preferably provided in cooking chamber 57 adjacent the upper portion thereof, as best seen in FIG. 5.

An electrical panel 417 of suitable construction well known to those skilled in the art is provided on carriage 17 (see FIG. 4) which includes a control box 419 of well known construction, and electrical receptacles 421, also of well known construction. It will be understood that control box 419 is supplied with a source of electricity, not shown, in the usual manner, and suitable wiring, well known to those skilled in the art, is utilized to control and supply motor 105, fan 313, lights 409, 411 and other electrical equipment as desired, with electricity in a manner well known to those skilled in the art. A cutting board 423 is preferably supported from carriage 17 by suitable means well known to those skilled in the art. Cutting board 423 is preferably provided with a hole 425 therethrough for holding a sauce dip pan, not shown. Also, another hole 427 is preferably provided for a pan to receive used hooks 121 and the like. In addition, hooks 429 are provided on cutting board 423 for holding knives, hot pads, knife sharpener, forks and other things needed during the cooking operation. It will be understood that the cutting board 423 is useful for preparing the meat, holding pans of meat for servicing the cooking tower 13 and the warming tower 15, or for many other uses well known to those skilled in the art.

In the operation of the cooker 11 of the present inventionn the food desired to be cooked is loaded on the appropriate holding means 87 which is then supported from shaft 79 either directly as in the case of the rack means 153 or from shaft 79 by carrousel 81 or 83. Coals C are ignited by means well known to those skilled in the art. Motor 105 is turned on to cause rotation of shaft 79 carrying with it holding means 87 with the food held thereby, which is cooked as the heat from heat source 19 passes over the food through the means heretofore described. The heat from heat source 19 is kept at such a temperature that the temperature at opening 319 is maintained at approximately 600° F. or above whereby the water from the juices of the food and the water in cooking chamber 57 which fall down onto grill means 235 explodes and vaporizes which causes the juices to vaporize and return to the meat and baste the meat in its own juices which was obtained from the meat in the first place, along with the seasoning rubbed into the product. Thus, there is moisture coming from water box 379 and from the meat which provides high humidity and then there are the juices that vaporize and baste the meat again and again in its own juices.

Also, it will be understood that the temperature of the holding means 87 is of such a degree that is cauterizes the meat at the places where the holding means pierces the meat. In addition, all of the edges and surfaces of the meat are cauterized by the heat so that substantially all of the juices are trapped on the inside providing a moist meat. In other words, the meat which is being cooked at a temperature of 325°-350°, ideally, has the tallow therein broken down which tends to permeate out through the meat and as it does these are the sweet juices that permeate through the meat. When the tallow reaches the surface where normally it would run out on the ground in the usual cookers, in the present cooker 11 it is trapped because the surfaces are cauterized. Stated another way, since the meat is not touched after handling in the cooker 11, the juices are sealed within thereby producing an exceptionally fine quality taste of the meat.

If desired, the cooked meat may be placed in a freezer and held for as long as one year and then put in a microwave oven in which case the meat will have substantially the same taste as originally. On the other hand, if desired the cooked meat may be placed in the warming chamber 61 preparatory to eating. It has been found that the ideal temperature of the warming chamber 61 is preferably above 135° F. but does not exceed 185° F. It should be pointed out that suitable thermometers, not shown, are provided to determine the temperatures in cooking chamber 57 and warming chamber 61.

Also it will be understood that any of the juices which fall through into the au'jus tray 191 are collected therein and may be utilized in a manner well known to those skilled in the art. On the other hand, if desired, au'jus tray 191 may be omitted and the juices allowed to drain out through valve 243 onto the ground or into a bucket or the like. In addition, it will be understood that since the heat source 19 is to one side and not below the cooking chamber 57, there is no flare up of the fuel C by the juices dropping thereon.

Although the present invention has been described and illustrated with respect to a preferred embodiment thereof and a preferred use thereof, it is not to be so limited since changes and modifications can be made therein which are with in the full intended scope of the invention.

I claim:
1. A cooker comprising:
    (a) a cooking tower including a cooking chamber in the interior thereof;
    (b) heat source means communicated with said cooking chamber for introducing heat into said cooking chamber, said heat source means being located to one side of said cooking chamber;
    (c) exhaust means communicating said cooking chamber with the outside atmosphere for exhausting the heat from said cooking chamber; and
    (d) conveying means for conveying the food in said cooking chamber while being cooked; said conveying means including shaft means rotatably mounted and extending vertically in said cooking tower, carrousel means mounted on said shaft means for rotation therewith and holding means supported from said shaft means for holding the food to be cooked; said holding means including a rack means for holding a split animal while being cooked and being removably hung from said shaft means, said rack means including an angle member for engaging said shaft means along a portion of the length thereof, framework means attached to said angle member for extending up into the inside of the split animal carcass, attachment means for attaching the animal to said framework means including socket means fixed to said framework and skewer means for extending through the animal carcass and into said socket means to pin the animal to said framework.

2. The cooker of claim 1 in which said rack means includes leg means fixed to said angle member for supporting said rack means from a supporting surface when removed from said shaft.

3. A cooker comprising:
    (a) carriage means including a pair of ground engaging wheels, and a ground engaging swivel wheel;
    (b) handle means coupled to said carriage means for moving said carriage means from place to place;
    (c) a cooking tower supported from said carriage including a cooking chamber in the interior thereof, said cooking chamber having an upper and lower end;
    (d) a warming tower including a warming chamber in the interior thereof, said warming tower being supported from said carriage means alongside of said cooking tower in adjoining relationship thereto;
    (e) heat source means supported by said carriage beneath said warming tower, said heat source means being communicated with said cooking chamber adjacent said lower end thereof for introducing heat into said cooking chamber for upward flow of the heat from adjacent the lower end thereof towards said upper end;
    (f) exhaust means communicating said cooking chamber adjacent the upper end thereof with the outside atmosphere for exhausting the heat from said upper end of said cooking chamber;
    (g) shaft means rotatably mounted and extending vertically in said cooking chamber;

(h) carrousel means mounted on said shaft means for rotation therewith; and (i) holding means supported from said shaft means for holding the food to be cooked, said holding means including a rack means for holding the food while being cooked and being removably hung from said shaft means, said rack means including framework means attached to said shaft means for receiving the food and attachment means for attaching the food to said framework means, said attachment means including skewer means for extending through the food to pin the food to said framework.

4. The cooker of claim 3 in which is included collection and removal means for collecting and removing the juice from said cooking chamber.

5. The cooker of claim 4 in which said cooking tower includes first door means for gaining access into said cooking chamber; said first door means including first window means for viewing into said cooking chamber; and in which said warming tower includes second door means for gaining access into said warming chamber and said second door means including second window means for viewing into said warming chamber.

6. The cooker of claim 4 which includes a cutting board means supported from said carriage, said cutting board means having holes therethrough for removably receiving containers, and hook means attached to said cutting board means.

* * * * *